United States Patent
Drouard

(10) Patent No.: US 8,313,250 B2
(45) Date of Patent: Nov. 20, 2012

(54) TELECOMMUNICATIONS CABLE INLET DEVICE

(75) Inventor: Patrick Drouard, Pontchateau (FR)

(73) Assignee: 3M Innovative Properties Company, St. Paul, MN (US)

( * ) Notice: Subject to any disclaimer, the term of this patent is extended or adjusted under 35 U.S.C. 154(b) by 222 days.

(21) Appl. No.: 12/934,438

(22) PCT Filed: Mar. 17, 2009

(86) PCT No.: PCT/US2009/037336
§ 371 (c)(1),
(2), (4) Date: Sep. 24, 2010

(87) PCT Pub. No.: WO2009/126411
PCT Pub. Date: Oct. 15, 2009

(65) Prior Publication Data
US 2011/0033157 A1    Feb. 10, 2011

Related U.S. Application Data

(60) Provisional application No. 61/043,652, filed on Apr. 9, 2008.

(51) Int. Cl.
*G02B 6/36* (2006.01)
*G02B 6/46* (2006.01)
*H02G 3/18* (2006.01)
*H05K 5/00* (2006.01)
*H01R 33/945* (2006.01)

(52) U.S. Cl. ............. 385/77; 385/86; 385/87; 385/135; 385/136; 385/137; 174/655; 174/520; 439/577

(58) Field of Classification Search .................... 385/53, 385/62, 69, 76, 81, 77, 86, 87, 100, 136, 385/137, 138, 139, 101, 135; 439/81, 89, 439/577, 271, 272, 237, 275, 350, 357, 358, 439/370, 438, 439, 442, 447, 459, 462; 174/50, 174/554, 564, 652, 653, 654, 655, 660, 665, 174/77 R, 520
See application file for complete search history.

(56) References Cited

U.S. PATENT DOCUMENTS

| 4,408,353 A | 10/1983 | Bowen et al. |
| 5,042,901 A | 8/1991 | Merriken et al. |
| 5,059,747 A * | 10/1991 | Bawa et al. ............ 174/655 |
| 5,231,688 A | 7/1993 | Zimmer |
| 5,416,874 A | 5/1995 | Giebel et al. |
| 5,600,094 A * | 2/1997 | McCabe ............ 174/653 |
| 5,689,607 A | 11/1997 | Vincent et al. |
| 5,745,633 A | 4/1998 | Giebel et al. |

(Continued)

FOREIGN PATENT DOCUMENTS

AT    387 295 B    12/1988

(Continued)

*Primary Examiner* — Brian Healy
(74) *Attorney, Agent, or Firm* — Janet A. Kling

(57) ABSTRACT

An inlet device is described herein for inserting a telecommunication cable into a telecommunications enclosure. An exemplary inlet device comprises a housing, and a compression member. The housing can include a compressible portion at the second end of the housing and a securing zone adjacent to the first end of the housing. The securing zone can include a plurality of deformable locking elements which protrude from opposite sides of the housing to lock the inlet device in a close fitting port of a telecommunication enclosure.

12 Claims, 12 Drawing Sheets

U.S. PATENT DOCUMENTS

| | | |
|---|---|---|
| 5,793,920 A | 8/1998 | Wilkins et al. |
| 5,838,861 A | 11/1998 | Bunde |
| 5,943,462 A | 8/1999 | Schofield |
| 6,017,243 A * | 1/2000 | Castaldo .................. 439/462 |
| 6,028,974 A | 2/2000 | Shyu |
| 6,269,214 B1 | 7/2001 | Naudin et al. |
| 6,278,831 B1 | 8/2001 | Henderson et al. |
| 6,466,725 B2 | 10/2002 | Battey et al. |
| 6,487,344 B1 | 11/2002 | Naudin et al. |
| 6,539,160 B2 | 3/2003 | Battey et al. |
| 6,736,545 B2 * | 5/2004 | Cairns et al. ................ 385/56 |
| 6,738,555 B1 | 5/2004 | Cooke et al. |
| 7,025,507 B2 | 4/2006 | De Marchi |
| 7,048,578 B2 * | 5/2006 | Rodrigues .................. 439/578 |
| 7,097,486 B2 * | 8/2006 | Parsons .................... 439/291 |
| 7,146,090 B2 | 12/2006 | Vo |
| RE41,743 E | 9/2010 | Naudin et al. |
| 7,976,070 B2 * | 7/2011 | Kiely ..................... 285/151.1 |
| 2003/0210875 A1 | 11/2003 | Wagner et al. |
| 2004/0240793 A1 | 12/2004 | Kerry |
| 2005/0208818 A1 | 9/2005 | Mtchedlishvili et al. |
| 2006/0120672 A1 | 6/2006 | Cody et al. |
| 2006/0133758 A1 | 6/2006 | Mullaney et al. |
| 2007/0003204 A1 | 1/2007 | Makrides-Saravanos et al. |
| 2007/0025677 A1 | 2/2007 | Harrison et al. |
| 2007/0189695 A1 | 8/2007 | Bludau et al. |
| 2008/0013888 A1 | 1/2008 | Barnes et al. |
| 2009/0060421 A1 | 3/2009 | Parikh et al. |
| 2010/0086260 A1 | 4/2010 | Parikh |
| 2011/0033157 A1 * | 2/2011 | Drouard ..................... 385/77 |

FOREIGN PATENT DOCUMENTS

| | | |
|---|---|---|
| EP | 0 478 169 A1 | 4/1992 |
| EP | 0 589 618 A1 | 3/1994 |
| EP | 1 450 449 A1 | 8/2004 |
| EP | 1 475 989 A1 | 11/2004 |
| EP | 1 575 134 A1 | 9/2005 |
| GB | 1 209 445 | 10/1970 |
| GB | 2 086 152 A | 5/1982 |
| WO | WO 94/24598 | 10/1994 |
| WO | WO 95/06891 | 2/1995 |
| WO | WO 00/72072 A1 | 11/2000 |
| WO | WO 2009/067311 A1 | 5/2009 |
| WO | WO 2009/126411 A1 | 10/2009 |

* cited by examiner

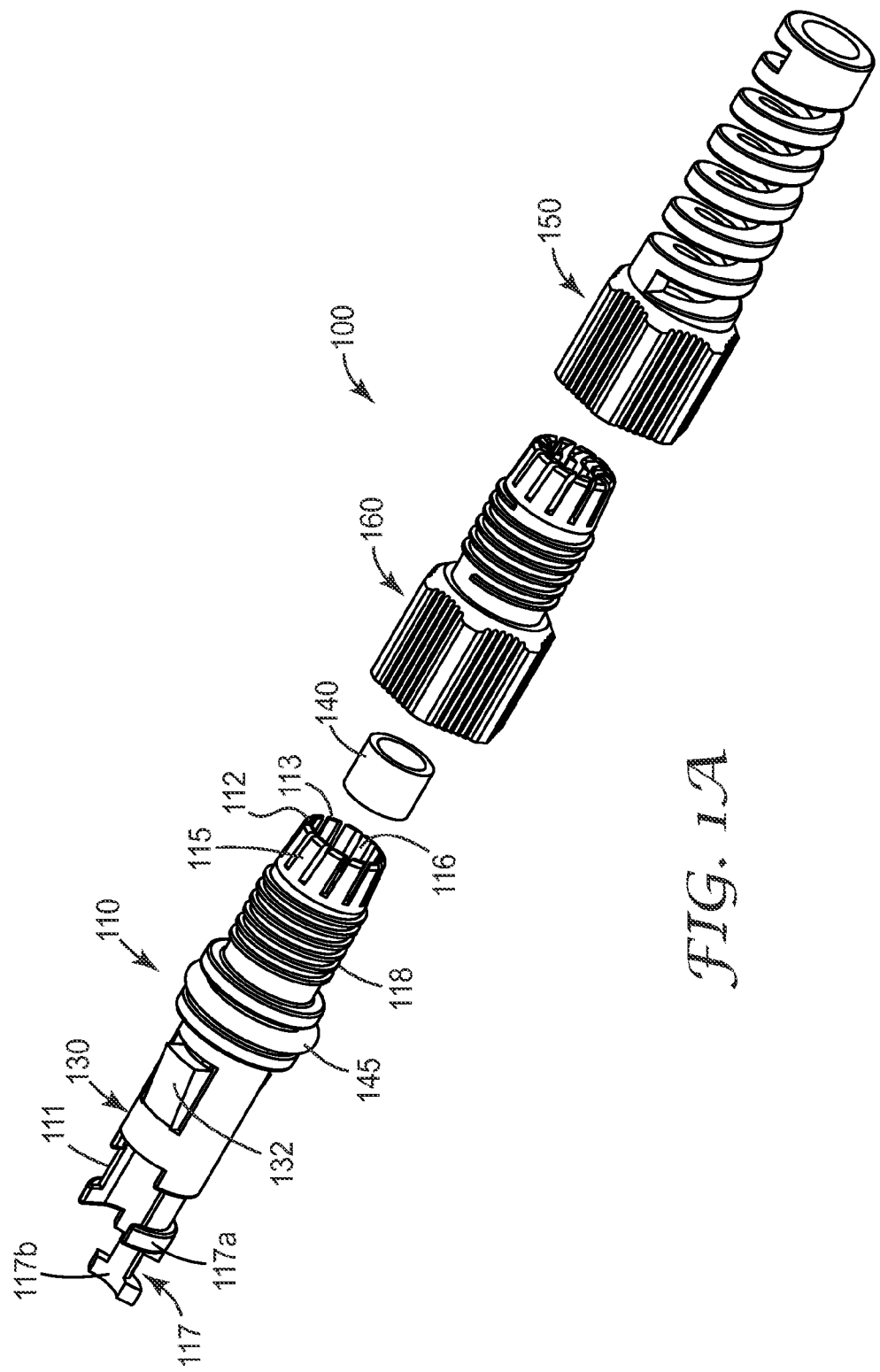

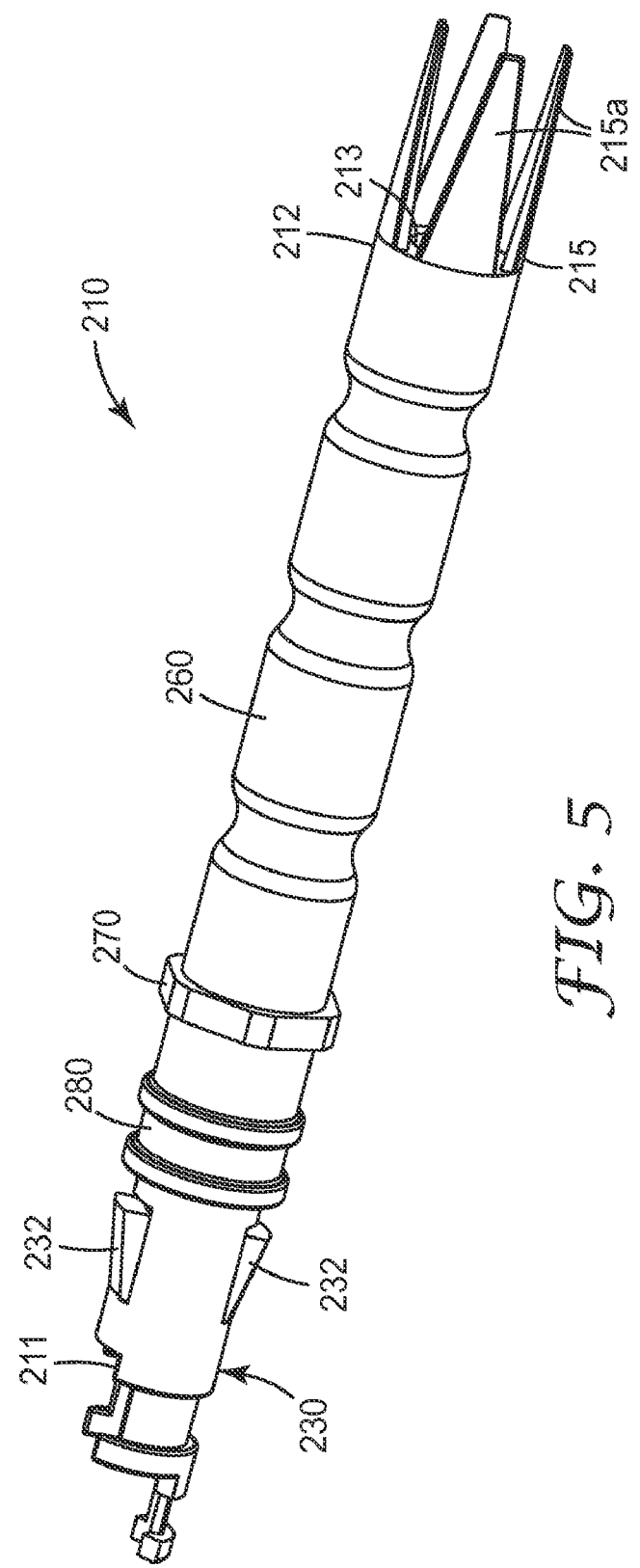

TELECOMMUNICATIONS CABLE INLET DEVICE

CROSS REFERENCE TO RELATED APPLICATIONS

This application is a national stage filing under 35 U.S.C. 371 of PCT/US2009/037336, filed Mar. 17, 2009, which claims priority to U.S. Provisional Application No. 61/043,652, filed Apr. 9, 2008, the disclosure of which is incorporated by reference in its/their entirety herein.

FIELD OF THE INVENTION

The present invention relates to an inlet device for inserting a telecommunication cable containing optical fibers, copper wires or coax cable into a telecommunications enclosure, e.g. into a terminal closure, pre-stubbed terminal, optical network terminal or other junction box.

BACKGROUND OF THE INVENTION

Telecommunication cables are ubiquitous and used for distributing data across vast networks. The majority of cables are electrically conductive cables (typically copper), although the use of optical fiber cables is growing rapidly in telecommunication networks as larger and larger amounts of data are transmitted.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunications enclosure to protect the exposed interior of the cable. The cable branches may be further distributed until the network reaches individual homes, businesses, offices, and so on.

Terminal enclosures are one type of telecommunications enclosure that is typically located near an end user to distribute the final service to the end user. Typical fiber terminals are designed to drop services (to provide service connections) to a small number of premises having typically between four to twelve end users. The last service connection from the fiber terminal is made to the optical network terminal (ONT), located at the end user using a drop cable. In optical fiber networks, for example, the ONT may be mounted on a wall at the end user. The ONT converts this optical signal into conventional electrical signals to provide voice (telephone), Internet (data) and video signals to the end user.

Many conventional telecommunication enclosures utilize either a mastic or rubber grommets for introducing cables into the enclosure. Conventional inlet devices are described in U.S. Pat. No. 6,487,344 and U.S. Publication No. 2009-0060421-A1 which can be inserted into a port in the wall of a telecommunications enclosure.

SUMMARY OF THE INVENTION

An inlet device is described herein for inserting a telecommunication cable into a telecommunications enclosure. The inlet device includes a housing and a compression member. The housing has a first end and a second end, wherein the housing includes a compressible portion at the second end of the housing and a securing zone adjacent to the first end of the housing. The securing zone includes a plurality of deformable locking elements which protrude from opposite sides of the housing to secure the inlet device in a close fitting port of a telecommunication enclosure.

In an alternative embodiment, the inlet device includes a housing, a cable securing device and a clamping nut. The housing has a first end and a second end, wherein the housing includes a compressible portion at the second end of the housing and a securing zone adjacent to the first end of the housing. The securing zone includes a plurality of deformable locking elements which protrude from opposite sides of the housing to secure the inlet device in a close fitting port of a telecommunication enclosure. The cable securing device compresses the compression portion of the housing to center the telecommunication cable in the inlet device. The clamping nut is secured to the second end of the cable retention device.

In an alternative embodiment, the inlet device may be installed in a telecommunication enclosure.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIG. 1A shows an exploded view of an exemplary inlet device according to an aspect of the present invention;

FIG. 5 shows an alternative inlet device according to an aspect of the present invention;

Figure 1B:
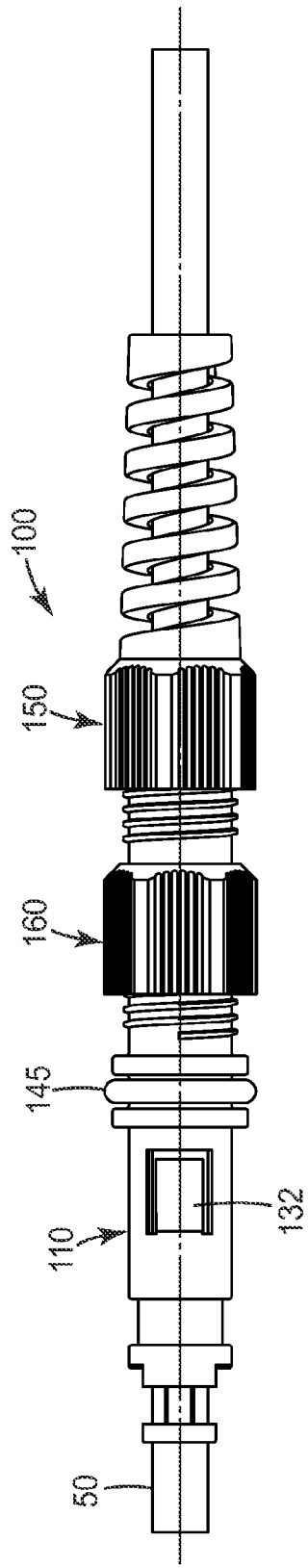
FIG. 1B shows an assembled view of the inlet device of FIG. 1A mounted on a communication cable.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Exemplary embodiments herein provide an inlet device for the insertion of a telecommunication cable (e.g. an optical fiber cable, a copper cable or coax cable) into a telecommunications enclosure. Particular advantages of the design of the present inlet device include a low cost, field installable inlet device that centers either single fiber cables or multi-fiber cables within the device. The inventive inlet device has fewer parts than some conventional inlet devices which makes it straight forward to install in the field.

The exemplary inlet device may be fitted to a communication cable and inserted into a port in a telecommunication enclosure to secure the telecommunication cable in the port. Depending on the communication network architecture, the telecommunication enclosure may be a buried closure, an aerial closure or terminal, a fiber distribution hub or an optical network terminal in the outside plant or a wall mount communication box, fiber distribution hub, a wall mount patch panel, or an optical network terminal in premise applications.

In one exemplary embodiment, the telecommunication cable is a fiber optic cable. The fiber optic cable typically includes a semi-rigid outer sheath surrounding at least one optical fiber and at least one strength member. The optical fibers may be enclosed in one or more loose buffer tubes or may be provided as one or more optical fiber ribbon cables. One to twelve optical fibers may reside in the loose buffer tube surrounded by a water-blocking gel or grease. Each of the ribbon cables may have from one to about twenty-four optical fibers. Each optical fiber has a polymeric coating that surrounds and protects the glass fiber. Examples of exemplary optical fiber cables include ResiLink ADF™ All-Dielectric Flat Drop Cable available from Pirelli Cables and Systems (Columbia, N.C.) or EZ DROP cable from Draka (Claremont, N.C.), and Mini DP Flat Drop Cable available from OFS (Northcross, Ga.). The optical fiber has a polymeric coating that surrounds and protects the glass fiber. The strength members may be either semi-rigid rods or a collection of loose fibers e.g. made of aramid fibers.

Alternatively, the telecommunication cable may be a low wire count copper cable having a semi-rigid sheath surrounding a plurality of paired copper wires or a copper coax cable.

Figure 1C:
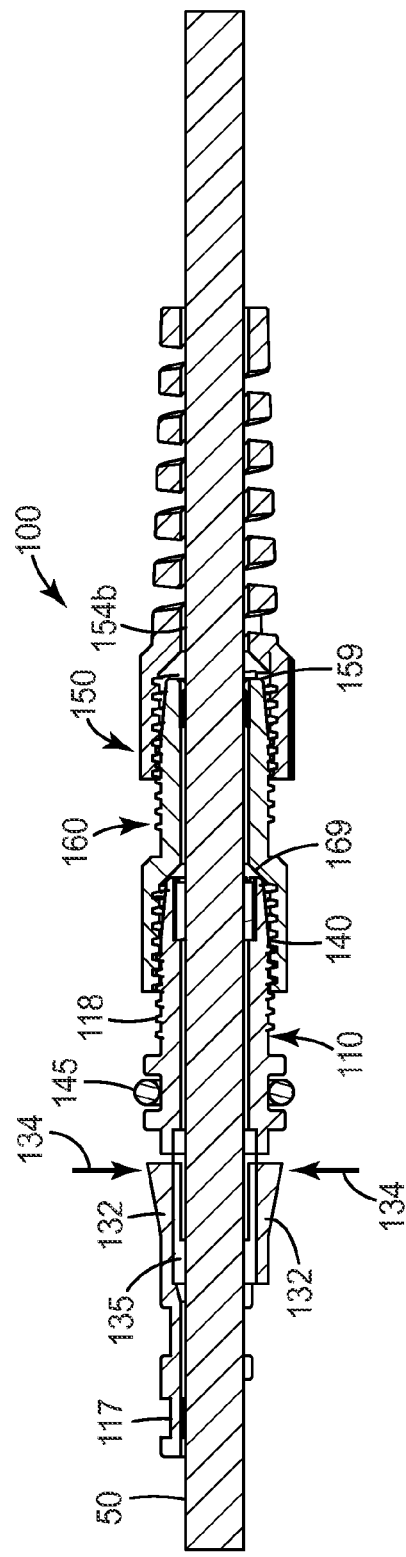
FIG. 1C shows a cross-sectional view of the inlet device of FIG. 1A mounted on a communication cable.

Referring to FIGS. 1A-1C, an exemplary inlet device 100 includes a housing 110 having a first end 111 and a second end 112, an internal sealing member 140 shaped to be received within the second end of the housing, and a compression member attachable to the second end of the housing. The compression member may be a cable securing device 160, a clamping nut 150 or device capable of applying a radial force to the second end of the inlet device housing. As shown in FIGS. 1A-1C, the compression member includes a cable securing device 160 attached to the second end 111 of housing 110 and a clamping nut attached to the second end 162 of the cable securing device 160. In an alternative aspect, the cable securing device can be omitted and the compression member includes clamping nut 150, which directly engages the second end of the housing. The inlet device 100 may be formed of plastic by conventional methods, for example by injection molding.

The housing may be generally cylindrical in shape and includes an interior passageway 113 that extends along the length of the housing from the first end 111 to the second end 112 of the housing. The housing includes a passage entry 114 at the first end 111 of the interior passageway and a passage exit 116 at the second end 112 of the interior passageway 113 that may be configured to accommodate certain categories of telecommunication cables including single fiber drop cables, multi-fiber cables, copper communication cables or coax cables.

The first end of the housing will reside inside the telecommunication enclosure when the inlet device has been fully inserted into a port of a telecommunication enclosure. The second end of the housing may be located within the port of the telecommunication enclosure when the inlet device has been fully inserted into a port of a telecommunication enclosure. Alternatively, the second end of the tubular body may extend completely through the port of the telecommunication enclosure.

A cable retention device 117 may be located adjacent to the first end 111 of housing 110. In one exemplary embodiment shown in FIGS. 1A and 2A, the cable retention device 117 may be integrally formed with the housing 110. The cable retention device may include a clip 117a and tie portion 117b. The clip 117a can retain the cable 50 in the cable retention device 117, for example by an interference fit. In some instances, the cable may not be securely held by clip 117a, so a cable tie or string (not shown) may be secured around the tie portion 117b and the cable to retain the cable in the device 117. Alternatively, the aramid strength members present in some optical fiber cables may be used to secure a fiber optic cable to the cable retention device 117 by wrapping a length of the aramid strength members around the tie portion 117b and tying them off. In an alternative embodiment shown in FIG. 2C, an alternative cable retention device 117' may be a separate part which may be secured to the first end 111 of the housing 110' such as by the insertion of a tongue 117b' on the cable retention device into the first end of the housing until it is locked in place by positioning bump 110b disposed on extension 110a of housing 110' into detent or hole 117a' on the bottom side of cable retention device 117'. An exemplary embodiment of such a cable retention device is described in U.S. Pat. No. 6,487,344, which is incorporated by reference herein, in its entirety.

The housing 110 can have a securing zone 130 adjacent to the first end 111 of the housing. The securing zone may include one or more locking elements 132 which protrude from the sides of the housing 110. In an exemplary embodiment of the inlet device, a pair of locking elements disposed on opposite sides of housing, are included and may have a deformable cantilever structure which can flex when depressed. As shown in FIG. 2B, the cantilever structure can include a free end 137 and an attached end 136. The attached end 136 is connected to the housing 110 and acts as a living hinge for the cantilever structure 132. In an exemplary embodiment shown in FIGS. 1C and 2B, the free end 137 of the cantilever structures may be depressed by applying an inward radial force 134. When depressed, the free end 137 of the cantilever structures can move into gap 135 formed between the telecommunications cable 50 inside the inlet device and the cantilever structure 132, such that the cantilever structures do not protrude beyond the external surface of the housing in that region. In this state, the inlet device may be removed from a close fitting port of a telecommunication enclosure. Thus, after insertion, the locking elements can secure protrude beyond the exterior surface of the housing to lock the inlet device a close fitting port of a telecommunication enclosure. Further, the inlet device may be removed from the close fitting port when the cantilever structures are sufficiently depressed.

Figure 2A:
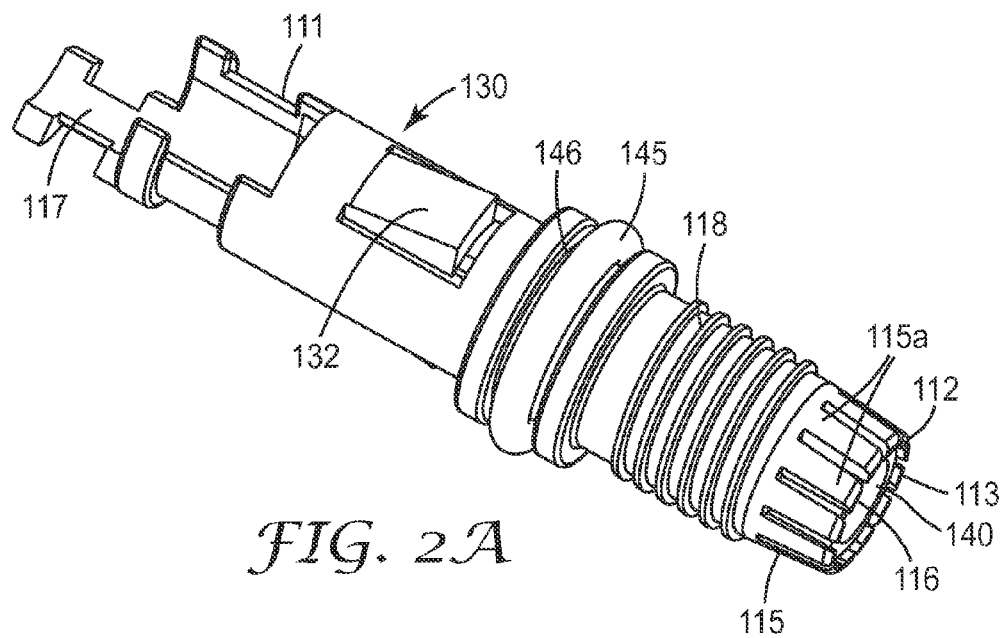
FIG. 2A shows an embodiment of an exemplary housing having an integral cable retention device usable with the inlet device of the current invention device according to an aspect of the present invention.
Figure 2B:
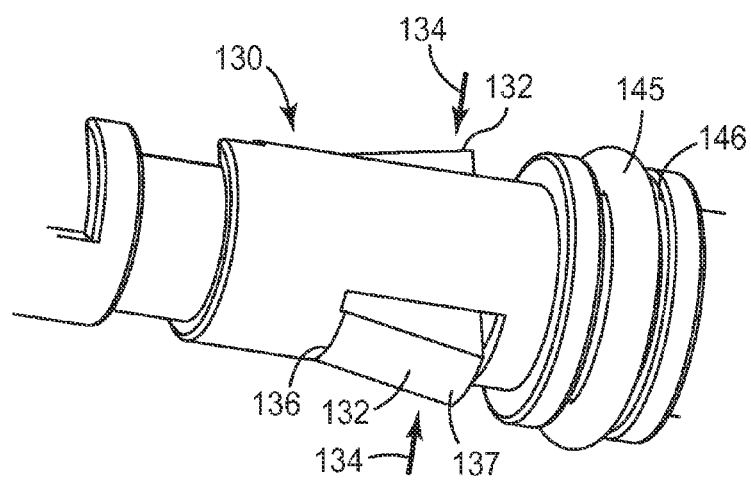
FIG. 2B shows a detailed view of the securing zone of the housing shown in FIG. 2A.
Figure 2C:
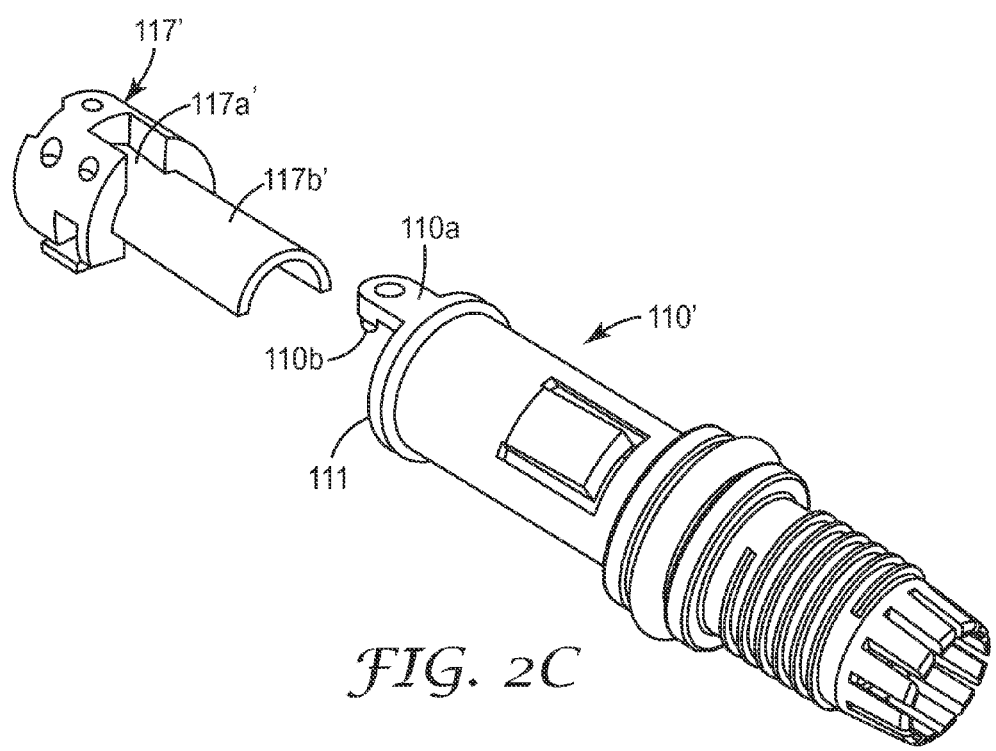
FIG. 2C shows an alternative embodiment of an exemplary housing having a separate cable retention device configured to engage with the housing.

The cantilever structure 132 may be created by cutting the cantilever structures free of the housing 110 on three sides as shown in FIGS. 2A-C. Alternatively, the cantilever structure 132 may be created when the housing is formed (e.g. by an injection molding). In an alternative embodiment, the locking elements may be spring loaded and/or have a hinge pin connecting the locking element to the housing of the inlet device. Alternatively, more than two locking elements may be used. Preferably, the locking elements are spaced evenly around the circumference of the housing. In yet another embodiment, the securing zone may include a receiving channel into which a forked locking device may be inserted to secure the inlet device into a port of a telecommunication enclosure.

A groove 146 may be located between the securing zone 130 and the second end 112 of housing 110 to receive an external sealing member 145 such as an o-ring. This external sealing member can provide an environmental seal between the inlet device and a port of a telecommunication enclosure when the inlet device is fully seated therein.

The housing 110 can have an external threaded portion 118 located between groove 146 and the second end 112 of the housing 110. The external threaded portion 118 cooperates with a corresponding internal threaded portion 168, 158 (see e.g., FIGS. 3C and 4B) of a compression member (e.g. a cable securing device 160 or a clamping nut 150, respectively) to cause a compressible portion 115 of the housing 110 to conform to an outer surface of the communication cable fitted in the inlet device.

The compressible portion 115 is formed at the second end 112 of the housing. The compressible portion 115 may be reduced in size (diameter) when an external radial force is exerted on it such as by application of a clamping nut 150 or a cable securing device 160. The compressible portion 115 centers the telecommunication cable in the inlet device 100 when the inlet device is installed on the telecommunication cable. The compressible portion 115 may include a plurality of spaced apart flexible fingers 115a which surround the passage exit 116. The fingers 115a may be squeezed together when either a cable securing device 160 or clamping nut 150 is attached to the second end of the housing. An optional internal sealing member 140 may be fitted into the interior passageway 113 in the compressible portion 115 of the housing 110 to improve the sealing capability of the inlet device around a telecommunication cable as may be needed in buried or other subterranean telecommunication enclosure installations. The telecommunication cable 50 passes through the internal sealing member 140 when the cable is installed into the inlet device 100. The tightening of the cable securing device or clamping nut over the collapsible portion of the housing compresses the internal sealing member. In some applications such as in premise installations, a lesser degree of environmental protection is required and the internal sealing member 140 may be omitted. In this case, the compressible portion of the housing directly grips the cable inserted therethrough.

Figure 3A:
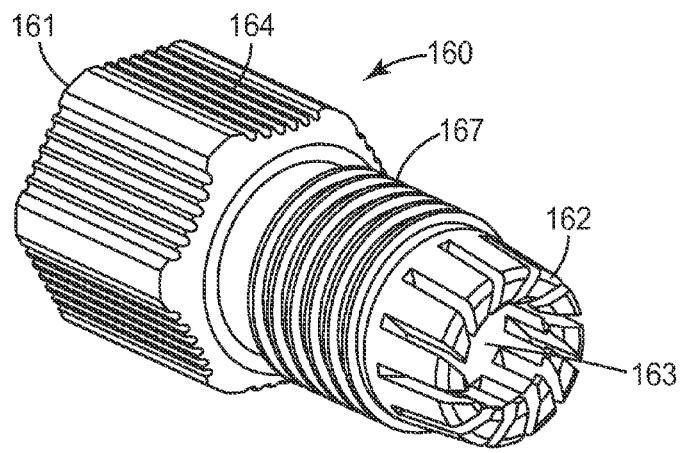
FIG. 3A shows an embodiment of an exemplary cable securing device according to an aspect of the present invention.
Figure 3B:
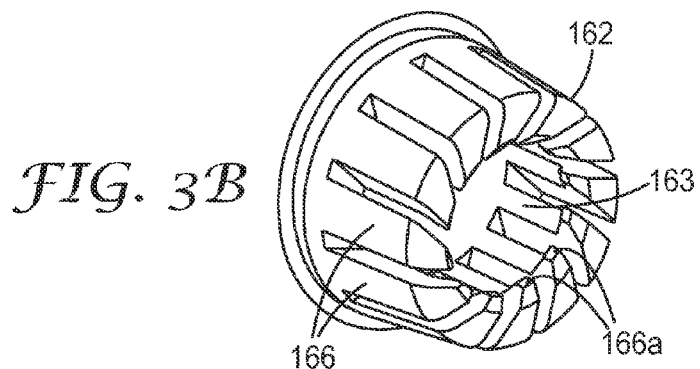
FIG. 3B shows a detailed view of a collapsible portion of the cable securing device shown in FIG. 3A.
Figure 3C:
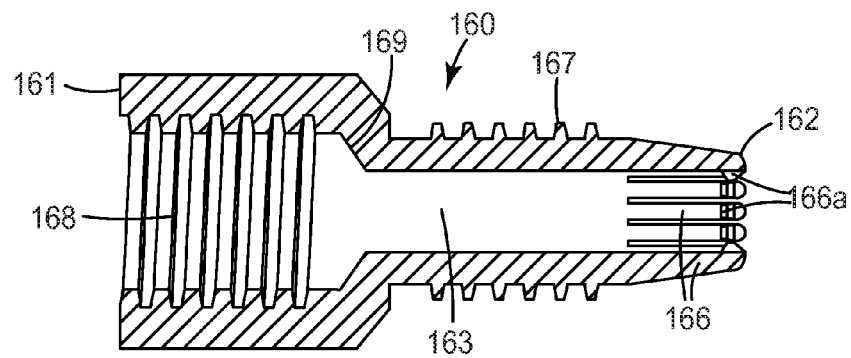
FIG. 3C shows a cross-sectional view of a collapsible portion of the cable securing device shown in FIG. 3A.

Additionally, cable securing device 160 may be fitted to the second end 112 of housing 110 as shown in FIG. 1B. FIGS. 3A and 3B show an exemplary embodiment of a cable securing device 160 according to an exemplary aspect of the present invention. The cable securing device 160 can have an elongated structure with a central bore 163 extending from a first end 161 to a second end 162. The cable securing device will have an internal threaded portion 168 (FIG. 1C) at the first end 111 thereof and an internal inclined wall portion 169 adjacent to the internal threaded potion 168. The internal thread can correspond to the external thread on the second end of the housing. The internal inclined wall portion 169 exerts a radial force on the compressible portion 115 of the housing 110 causing the fingers 115a to be pressed closer together to center the cable in the inlet device. When the collapsible portion is collapsed, the squeezing to the fingers 115a compresses the internal sealing member 140 (FIG. 1A) against the telecommunication cable providing an environmental seal around the telecommunication cable passing through the inlet device.

In an exemplary embodiment, the cable securing device 160 can have a gripping surface 164 on the external surface of the cable securing device that corresponds to the position of the internal threaded portion 168. The external gripping surface may have a hexagonally shaped cross-section as shown in FIG. 3A to facilitate gripping of the cable securing device with a tool or by hand. The gripping surface region may have other geometric configurations such as a cylindrical shape, a rectangular shape or other polygonal shape. Additionally, the gripping surface may be textured (e.g. a ridged or cross-hatched texture) to further facilitate gripping of the cable securing device.

The cable securing device 160 can have a plurality of spaced apart projections 166 extending from the cable securing device at the second end 162 thereof. Additionally, an external thread 167 may be disposed on the external surface of the cable securing device between the gripping surface 164 and the projections 166.

Each projection 166 may have a barb 166a and/or a plurality of teeth (not shown) disposed near its interior end (i.e. the side of the projection that faces the central bore). The barbs 166a can penetrate the sheath of a telecommunication cable when a clamping nut 150 is secured to the second end 162 of the cable securing device 160. The clamping nut exerts a radial force on the spaced apart projections 166 pushing them inward and pushing the barbs 166a into sheath of the telecommunications cable.

In premise applications, such as insertion of cables into junction boxes within a building, an inlet device may have reduced environmental sealing requirements. In these instances, an inlet device having a reduced axial length can be used wherein the fingers in the compressible portion of the housing may have barbs or teeth as described above for the cable securing device 160. Thus, for such applications, an exemplary inlet device with locking elements as described above can omit the cable securing device and the internal sealing member resulting in a more compact inlet device structure.

FIGS. 4A-4E illustrate several embodiments of cable clamping nuts 150A-150E. The basic structure of the clamping nut will be described with respect to FIG. 4D. Cable clamping nut 150D, shown in FIG. 4D, has an interior chamber 153 extending between the first side 151 and a second side 152. The interior chamber 153 has a first opening 154 at the first end 151 to accept the second end 112 of housing 110 (FIG. 2A) and/or the second end 162 of cable securing device 160 (FIG. 3A). The chamber 153 has a smaller second opening (not shown) at the second end 151 of the cable clamping nut 150D to accommodate the passage of a telecommunication cable therethrough. The chamber 153 has an internal threaded portion 158 that can correspond to the external thread on the second end of the housing and/or the second end of the cable securing device to allow the cable clamping nut to be secured to the housing and/or the cable securing device.

In an exemplary embodiment, cable clamping nut 150D can have a gripping surface 157 on the external surface of the cable clamping nut that corresponds to the position of the internal threaded portion 158. The external gripping surface may be a hexagonally shaped cross-section as shown in FIG. 4D to facilitate gripping of the cable securing device with a tool or by hand. The gripping surface region may have other geometric configurations such as a circular cross-section (FIG. 4E), a rectangular cross-section or other polygonal cross-section. Additionally, the gripping surface may be textured (e.g. a ridged or cross-hatched texture) to further facilitate gripping of the cable securing device.

Figure 4A:
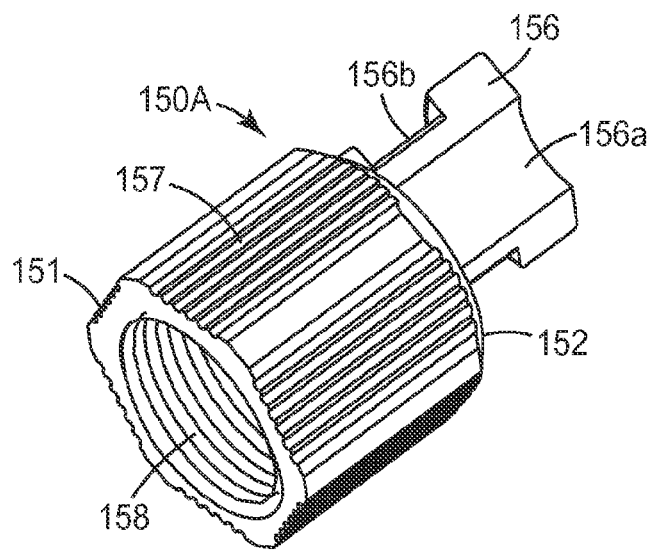
FIGS. 4A-4E show several close-up views of clamping nuts according to an aspect of the present invention.

An alternative clamping nut 150A is shown in FIG. 4A. The basic structure of cable clamping nut 150A is similar to that of clamping nut 150D. However, cable clamping nut 150A includes a strain relief bracket 156 extending from the second side 162 of the claming nut 150A. The strain relief bracket 156 can have a concave shaped inner surface 156a that generally conforms to and cradles a telecommunication cable when it is installed in the inlet device. Additionally, strain relief bracket 156 can have a plurality of notches 156b or a channel in its external surface to accommodate a cable tie (not shown) which is used to secure the telecommunications cable to the clamping nut 150A.

Figure 4B:
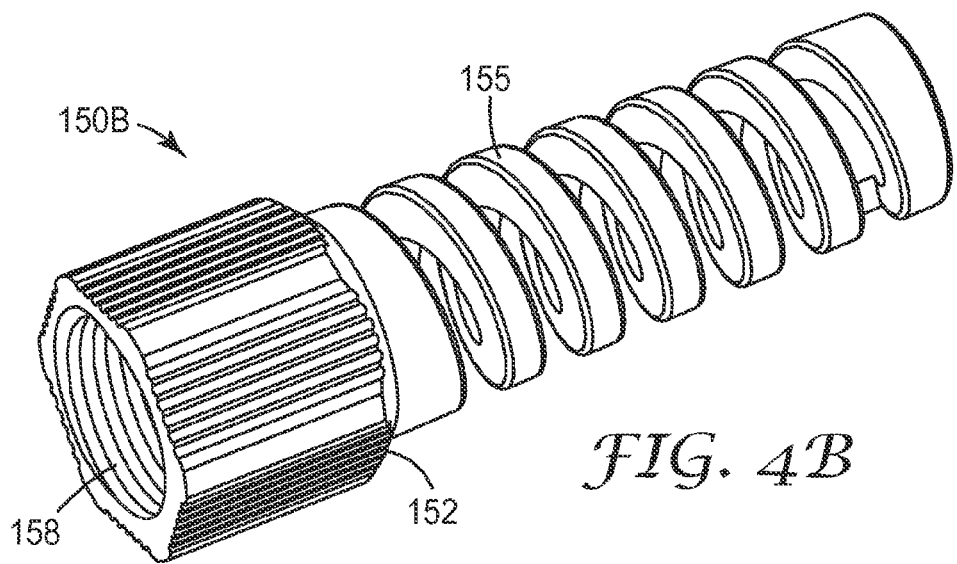

FIG. 4B shows another alternative cable clamping nut 150B including an integral bend control boot 155 disposed on the second end 152 of the clamping nut. The bend control boot prevents a telecommunication cable from exceeding its minimum bend radius which could result in degradation of the signal being carried on the telecommunication cable. A second opening of this embodiment of the cable clamping nut is shown in FIG. 1C and opening 154b.

Figure 4C:
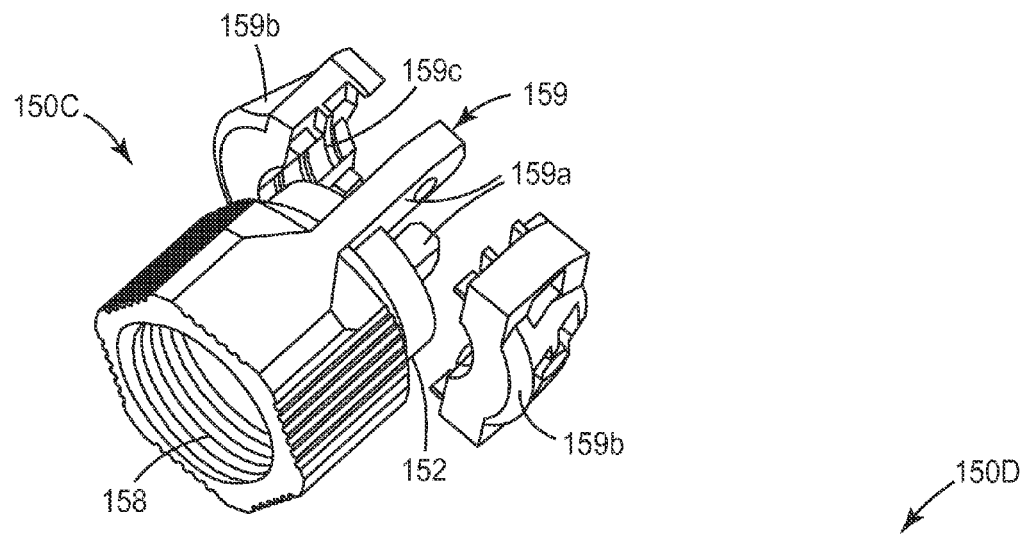
Figure 4D:
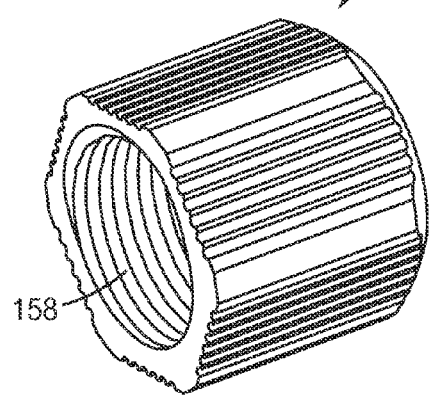
Figure 4E:
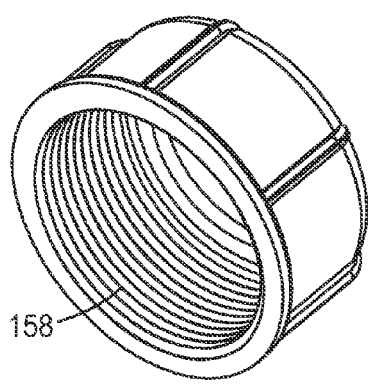

Referring to FIG. 4C, another alternative cable clamping nut 150C is shown. Cable clamping nut 150C includes a retaining clamp 159 disposed on the second end 152 of cable clamping nut 150C to securely hold the telecommunication cable. Two longitudinal side tabs 159a project from the second end 152 of clamping nut 150C. Two halves 30, 31 of retaining clamp 159 may be secured to the longitudinal side tabs by conventional mechanical fasteners (not shown) such as by screws or rivets. The interior surface 159c of the two clamp halves may be concave and have ridges or barbs to bite into the sheath of the telecommunication cable to further securely grip the telecommunications cable when it is installed into an exemplary inlet device. In an alternative embodiment, one of the halves of the retaining clamp may be integrally formed with the longitudinal side tabs to reduce the number of parts required.

FIG. 5 shows an alternative embodiment of a housing 210 having a first end 211 and a second end 212. The housing 210 may be generally cylindrical in shape and includes an interior passageway 213 that extends along the length of the housing from the first end 211 to the second end 212 of the housing. The housing includes a passage entry at the second end 212 of the interior passageway 213 that may be configured to accommodate certain categories of telecommunication cables including single fiber drop cables and multi-fiber cables.

Housing 210 can have a securing zone 230 adjacent to the first end 211 of the housing. The securing zone 230 may include a pair of locking elements 232 which protrude from opposite sides of the housing 210. In an exemplary inlet device, the locking elements may have a deformable cantilever structure which can flex when depressed as described previously.

The exemplary housing 210 includes a compressible portion 215 formed at the second end 212 of the housing. The compressible portion 215 may be reduced in size when an external force is radially exerted on it such as by application of a protective sleeve (not shown). The compressible portion 215 centers the telecommunication cable in the inlet device when the inlet device is installed on the telecommunication cable. The compressible portion 215 may include a plurality of spaced apart flexible fingers 215a which surround the passage entry. In this alternative aspect, a clamping nut and a cable securing device/clamping nut combination can be omitted.

Other features of the housing 210 may include cable strain relief attachment surface 260, an orientation control section 270, an annular channel 280 to hold an external sealing member (e.g. and o-ring, not shown), and a cable retention device 217 which are all integrally formed with housing 210.

A protective sleeve (e.g. a section of heatshrink tubing, not shown) can fit over the cable strain relief attachment surface 260 to secure and provide a water resistant and/or dustproof seal around the telecommunication cable when it is installed onto the housing. The protective sleeve exerts the radial force as it is heated, which collapses the compressible portion 215. Additionally, this protective sleeve can provide a strain relief to the cable by maintaining the proper bend radius of the cable when it is installed in a telecommunications enclosure. Also, the cable strain relief member provides retention of the cable against pull-out forces.

The orientation control section 270 may be utilized when the inlet device 200 is inserted into port that has a complementary port structure in a telecommunications enclosure 300 in a known or controlled orientation.

Figure 6:
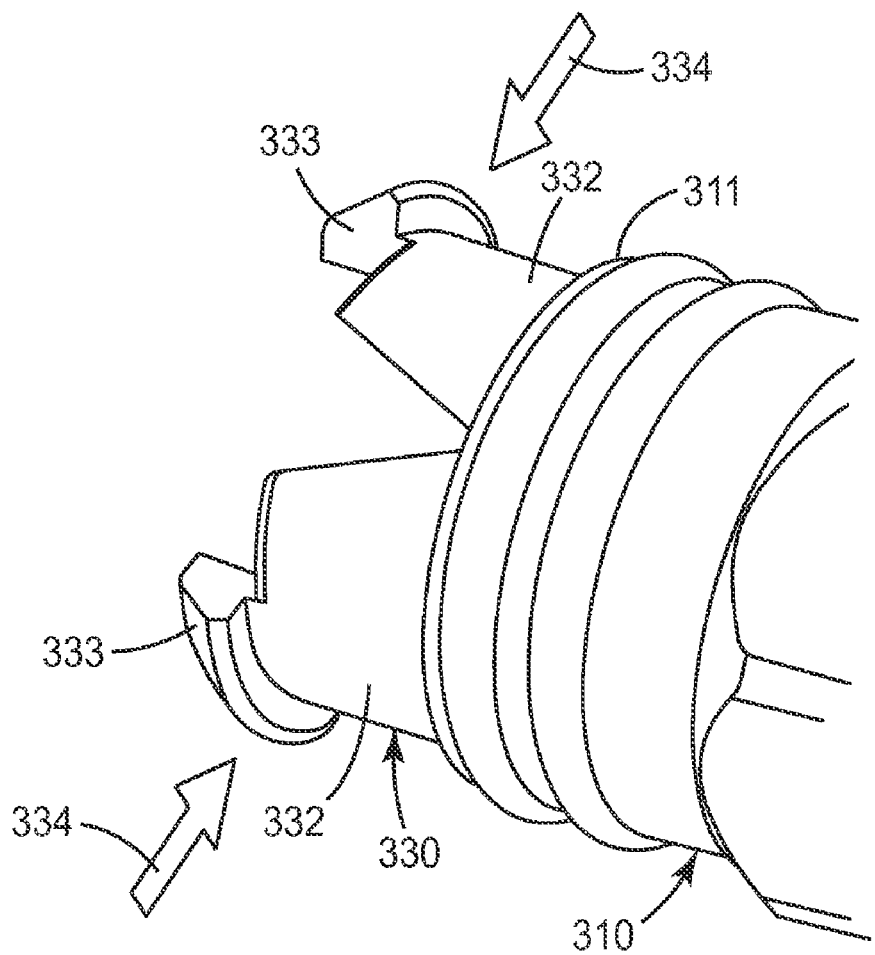
FIG. 6 shows a detailed view of an alternative embodiment of the securing zone according to an aspect of the present invention.

FIG. 6 shows an alternative a securing zone configuration for an inlet device where a securing zone 330 is adjacent to the first end 311 of the housing 310. The securing zone 330 may include a pair of resilient locking legs 332 which protrude from opposite sides of the first end of the housing 310. Each locking leg 332 has a foot 333 located on its external distal end. When installed in a telecommunication enclosure, the foot on each leg extends past the entrance of the port to retain the inlet device in the telecommunications enclosure. In an exemplary embodiment, the locking legs 332 may be depressed by applying an inward force 334 perpendicular to the axial length of the inlet device. When depressed, foot on each locking leg is positioned such that neither foot protrudes beyond the external surface of housing 310. In this state, the inlet device may be removed from a close fitting port of a telecommunication enclosure. Thus, when fully inserted, the feet 333 on the ends of the locking legs 332 protrude beyond the exterior surface of the housing to lock the inlet device a close fitting port of a telecommunication enclosure, but the inlet device may be removed from a close fitting port when the locking legs are sufficiently depressed.

Figure 8:
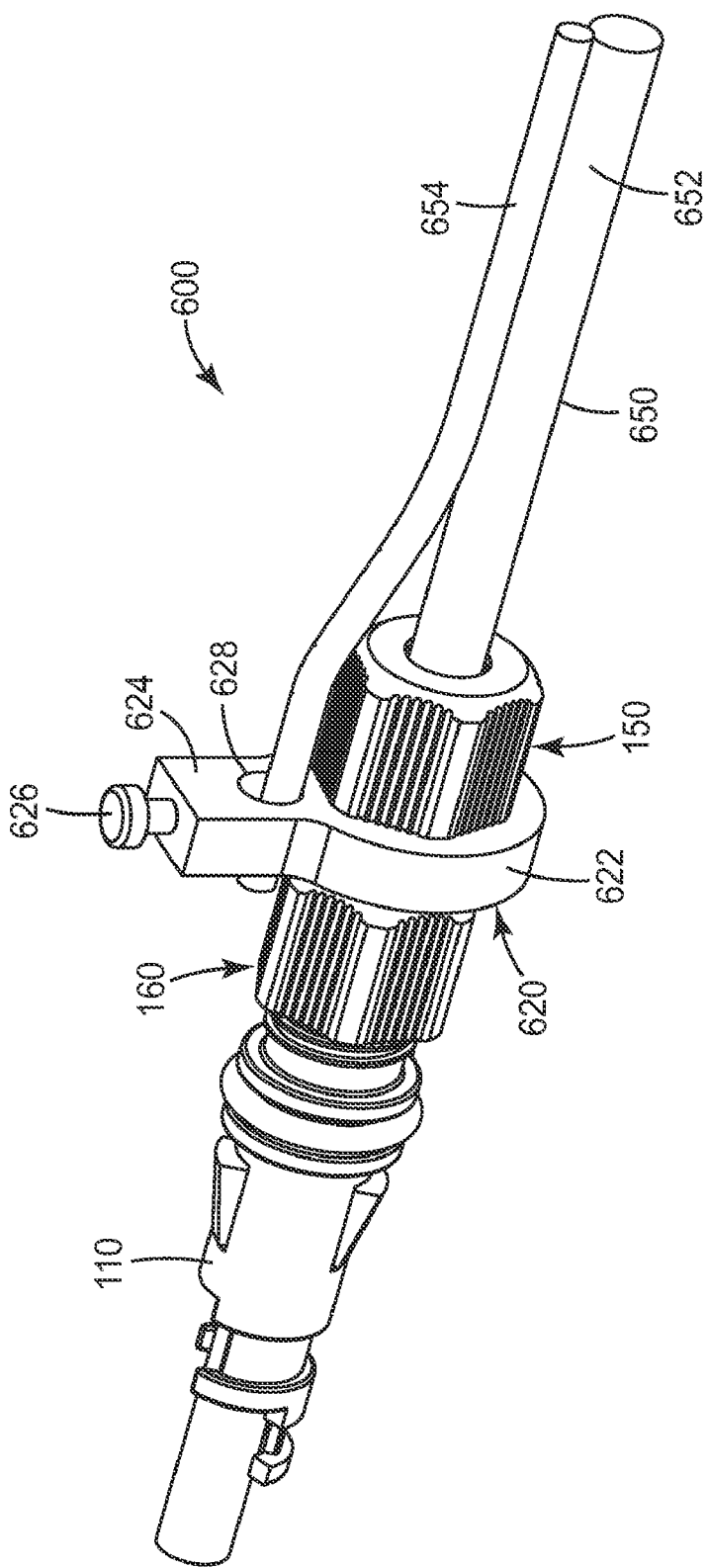
FIG. 8 shows another alternative embodiment of an exemplary inlet device according to an aspect of the present invention.

Another alternative embodiment of an exemplary inlet device 600 is shown in FIG. 8. The features of inlet device 600 are similar to the features of inlet device 100 shown in FIG. 1B. However, inlet device 600 includes an auxiliary strength member holder 620 which can be fitted over the second end of cable securing device 160 and locked in place when clamping nut 150 is secured in place. The strength member holder 620 can be used in applications with "Figure-8" type drop cables such as EZ-DROP Figure 8 Drop Cables available from Draka (Claremont, N.C.). "Figure-8" drop cables 650 include either an external strength member or messenger 654 attached to a fiber optic drop cable 652. An exemplary strength member holder 620 may have a generally keyhole shape which includes rectangular yoke 624 attached to a ring shaped base 622. The yoke 624 has an opening 628 passing therethrough. The messenger of the "Figure-8" drop cable may be inserted though opening 628 and locked in place by a mechanical device or fastener, for example by a thumb screw 626, or a set screw. The strength member holder 620 may be formed of plastic or of metal by conventional methods. Alternatively, strength member holder 620 may be integrally formed on the first end 151 of clamping nut 150.

At each point where a telecommunication cable is opened, a telecommunications enclosure is provided to protect the exposed interior of the cable. Terminal closures are one type of telecommunications enclosure used in communication networks to distribute service to the end user. Terminal closures are designed to provide service connections to a number of homes or businesses having typically between four to twelve end users.

Figure 7A:
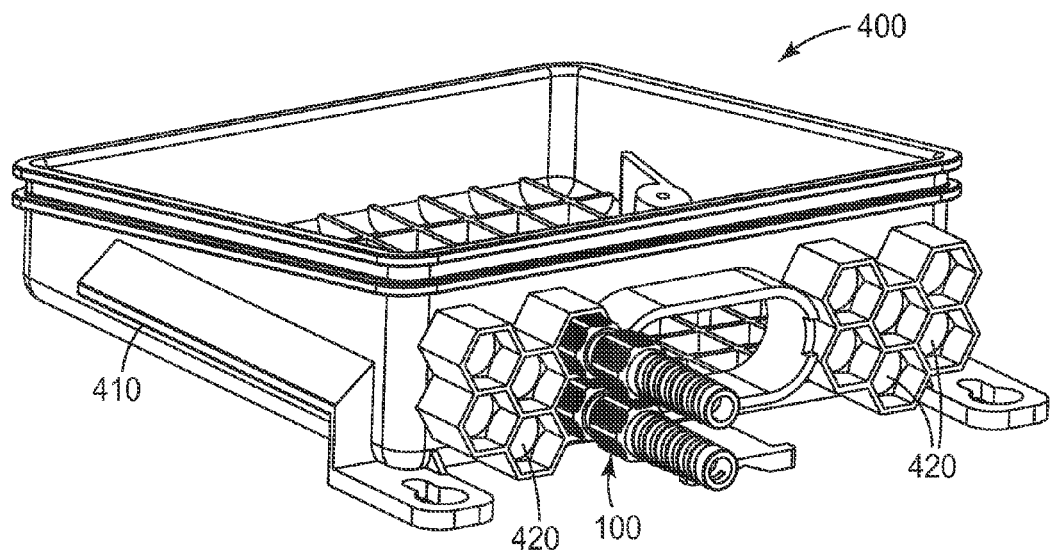
FIGS. 7A-7C show exemplary inlet devices installed into a telecommunication enclosure.

An exemplary telecommunications enclosure or terminal closure 400 according to one embodiment of the invention is illustrated in FIG. 7A. Terminal closure 400 includes a base 410 and a cover or housing (not shown) removeably securable to the base. The base 410 includes at least one port 420 for receiving an inlet device 100. The base may have one, two, or any other number ports 420 as is required for a particular terminal closure 400. In the embodiment shown in FIG. 7A, the ports 420 are disposed in a hexagonal close packing arrangement which is made possible by the geometry of the inlet device. This arrangement allows for more ports to be accommodated in a smaller amount of space, thus possibly increasing the capacity of terminal closure. When the ports are designed to accommodate an inlet device having a hexagonal cable securing device and/or clamping nut, the port structure can resemble a honeycomb. The cover may be secured to the base 410 by a bail, clamps or other mechanical fastening method. When engaged, the base and cover provide protection for the internal components of the terminal closure 400 from weather, insects and other external hazards.

Figure 7B:
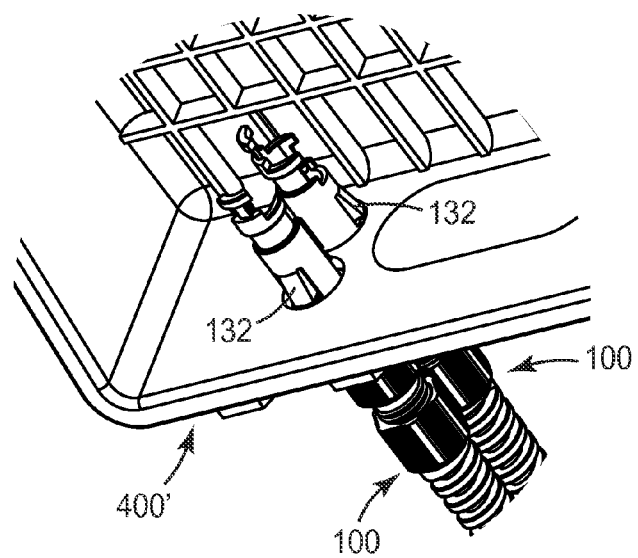

FIG. 7B shows an interior view of a terminal enclosure 400', where the locking elements 132 of inlet device 100 engage with the terminal enclosure when the inlet device 100 is installed.

Figure 7C:
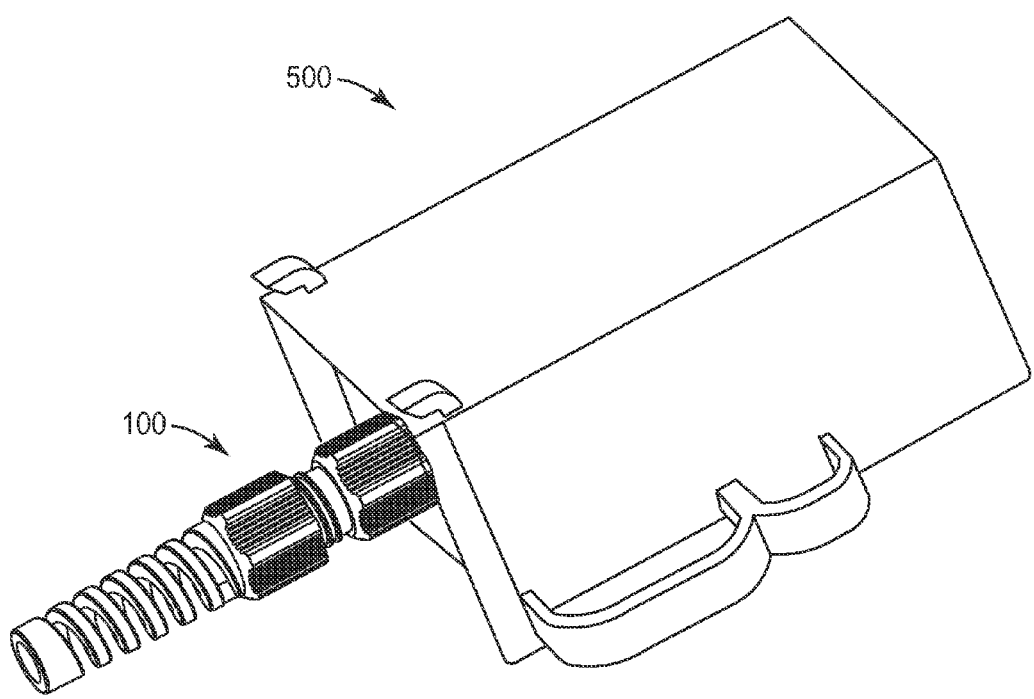

The exemplary inlet device described herein may also be installed in an optical network terminal (ONT). FIG. 7C shows an inlet device 100 to be inserted into an optical network terminal 500, which can be located on the side of a customer's home or other premise location. The ONT converts this optical signal into conventional electrical signals to provide voice (telephone), Internet (data) and video signals to the end user in a hybrid communication network.

The inlet device embodiments described above provide a simple and user-friendly design thereby greatly facilitating the installation of the last leg of the FTTH network to the end user.

Various modifications including extending the use of the inlet device to applications with copper telecommunication cables or copper coax cables, equivalent processes, as well as numerous structures to which the present invention may be applicable will be readily apparent to those of skill in the art to which the present invention is directed upon review of the present specification.

I claim:

1. An inlet device to be fitted to a communication cable, the device comprising:
   a housing having a first end and a second end, wherein the housing includes a compressible portion at the second end of the housing and a securing zone adjacent to the first end of the housing to secure the inlet device in a close fitting port of a telecommunication enclosure, and wherein the securing zone includes a plurality of deformable locking elements which protrude from opposite sides of the housing; and
   a compression member,
   wherein the deformable locking elements do not protrude beyond an external surface of the housing when depressed to allow removal of the inlet device from close fitting port of a telecommunication enclosure.

2. The inlet device of claim 1, wherein the compressible portion of the housing comprises a plurality of spaced apart fingers.

3. The inlet device of claim 1, wherein the compression member comprises a clamping nut and wherein the compression member is fitted over the collapsible portion of housing to cause the collapsible portion to conform to an outer surface of the communication cable fitted in the inlet device.

4. The inlet device of claim 3, wherein the compression member further comprises a cable securing device secured to the second end of the housing; and wherein the clamping nut is fitted to a second end of the cable securing device opposite the end which is connected to the housing.

5. The inlet device of claim 4, wherein the cable securing device includes a collapsible portion at the second end of the cable securing device, wherein the collapsible portion comprises a plurality of spaced apart projections.

6. The inlet device of claim 5, wherein each of the spaced apart projections includes a barb, wherein each barb is designed to penetrate a sheath of the telecommunication cable when the inlet device is installed.

7. The inlet device of claim 3, wherein the cable clamping nut includes one of a strain relief bracket, an integral bend control boot and a retaining clamp disposed on a second end of the clamping nut.

8. The inlet device of claim 1 mounted on at least one end of the optical fiber cable, wherein the optical fiber cable includes at least one optical fiber and at least one strength member, and wherein the inlet device is secured in a port of a telecommunication enclosure.

9. The inlet device of claim 1 mounted on an end of the telecommunication cable, wherein the telecommunication cable is one of an optical fiber cable, a copper cable and a coax cable.

10. The inlet device of claim 1, further comprising a strength member retention device.

11. A telecommunication enclosure comprising at least one inlet device as described in claim 1 secured in a port of the telecommunication enclosure.

12. The telecommunication enclosure of claim 11 comprising a honeycomb port structure.

* * * * *